2,904,521

METHOD OF PREPARING SILICA-ALUMINA CATALYSTS

Leon L. Baral, Baltimore, Md., assignor to W. R. Grace & Co., New York, N.Y., a corporation of Connecticut No Drawing. Application December 29, 1953
Serial No. 401,031

8 Claims. (Cl. 252—455)

This invention relates to silica-alumina catalysts and more particularly to a novel and improved method of preparing silica-alumina catalysts.

Silica-alumina composites are in extensive commercial use for catalytic purposes as the catalyst itself, as a component thereof, or as a carrier for a catalytic agent. These composites usually comprise silica gel as a major constituent (60%–90%) and alumina as a minor constituent (40%–10%) with a minimum of impurities. The most commonly employed method for their preparation consists of mixing a mineral acid with a sodium silicate solution to form a silica hydrogel, impregnating the hydrogel with an aluminum salt solution, adding a basic precipitant to precipitate alumina, washing the resulting silica-alumina composite to remove undesirable impurities, and drying and activating the washed composite. In this method, the silica hydrogel may be washed prior to impregnation or the washing may be deferred until after the composite has been dried. In another method, a washed silica hydrogel is saturated with an aluminum salt solution and the mixture is heated to decompose the salt and deposit alumina on the silica.

The properties of silica-alumina catalysts may vary tremendously with only slight variations in the method of preparation. Consequently, the procedures employed in the preparation of these catalysts are very precise and must be carefully followed. Any deviations may result in extreme operating difficulties or may adversely affect the performance of the finished catalyst. Therefore, variations in the preparation of the catalyst have been instituted infrequently and then only with extreme caution.

One method prominently employed in the preparation of silica-alumina cracking catalysts is to interact an acid and sodium silicate to form an alkaline silica hydrosol, allow the hydrosol to set to a hydrogel, age the hydrogel for a short period, add additional acid to reduce the pH of the mixture well below the neutral point, add a basic reagent to neutralize the acidity, add alum solution to provide the desired amount of alumina, and precipitate the alumina by the addition of ammonia. In this method, the additional acid with which the initially formed silica hydrogel is treated must be neutralized with ammonia before the addition of alum. While this appears to be a waste of reactants attempts to avoid these adjustments have heretofore failed because their elimination brought about operating difficulties or resulted in an unsatisfactory catalyst. This method is covered by U.S. Patent No. 2,462,236 of C. L. Thomas.

It has also been proposed to prepare silica-alumina catalysts by adding the alum directly to the alkali silicate. This has the disadvantage that the product formed is zeolitic in nature and makes the purification step difficult. In fact, the zeolitic soda cannot be removed by water-washing and a base-exchange operation is necessary to lower the soda content of the finished catalyst to an acceptable level. The cost of the base exchange operation offsets the savings in ammonia and acid.

In accordance with the present invention, a process has been developed whereby the generally employed prior art method has been simplified in that the steps of adjusting the pH of the silica hydrogel mixture by the addition of excess acid and ammonia prior to the alum addition have been eliminated without impairing the quality of the catalyst. The elimination of these steps results in a considerable saving of acid and ammonia requirements. In addition, the manpower and equipment needs are appreciably reduced.

It is therefore an object of this invention to provide an improved method of manufacturing silica-alumina catalysts. It is another object of this invention to provide a simpler method of producing silica-alumina catalysts. A further object is to provide an economical method of manufacturing silica-alumina catalysts. These and other objects will become apparent from a study of the following detailed description and the appended claims.

In accordance with the present invention, an alkaline silica hydrosol is prepared by interacting an aqueous solution of an alkali metal silicate, such as sodium silicate, with a mineral acid. A suitable mineral acid may be sulfuric, hydrochloric, nitric acid, etc., but for economic reasons it is usually sulfuric. The streams of silicate and are usually commingled in a mixing nozzle to which the amounts of silicate and acid are carefully metered so that the pH of the resulting mixture is maintained between about 9.5 and 10.5. If the pH of the mixture at this stage is below this level, setting occurs too rapidly and the resulting hydrogel is somewhat firmer than is desirable with the result that processing in the subsequent steps is made more difficult. On the other hand, if the pH is above about 10.5, setting may be undesirably slow.

The hydrosol flows from the mixing nozzle into a tank where it is allowed to gel. Under the described conditions, this usually requires about 3–5 minutes. The hydrosol is preferably stirred during gelation so that there results a slurry of silica hydrogel. This slurry is thoroughly mixed with an amount of aluminum sulfate (alum) solution sufficient to provide the desired alumina content in the final silica-alumina catalyst. If the alum solution is prepared by dissolving alumina in sulfuric acid, it may contain a small amount (1½% to 2½%), of free sulfuric acid. This facilitates dissolution of all of the alumina hydrate and minimizes the formation of complexes which might result in an excessively high sulfate content in the final catalyst. The pH of the mixture after alum addition is usually around 3.

To the alum-silica hydrogel mixture is then added a sufficient quantity of a basic precipitant, preferably ammonia, to precipitate the alum as alumina. The addition of the basic precipitant raises the pH of the mixture to about 7.5. The mixture is aged for about 15 minutes, at which time it has a pH of about 7.0.

The slurry of silica-alumina composite prepared in the above manner is filtered and further processed according to conventional methods. After filtration, the usual procedures are to dry, wash and re-dry, or if desired, the material may be washed as a hydrogel prior to drying. The order of washing and drying may be varied by the practitioner of the invention. Thus, in the present invention, the conventional steps of acid and alkaline adjustment of pH in which acid and ammonia were added to the silica hydrogel prior to the alum addition have been eliminated. The satisfactory elimination of these steps is accomplished by adding the alum solution to the silica hydrogel. In such alkaline gelation, only about 60–85% of the $Na_2O$ in the silicate is neutralized by the initially added acid. The alum solution which is added to the alkaline hydrogel completes the neutralization of the silicate and precipitates some silica and some alumina. Ammonia is then added to precipitate the remaining alumina. The resulting composite is similar to that obtained in conventional processes and is far superior to the composite obtained by direct addition of alum to silicate solution.

The following non-limiting example illustrates one embodiment of the present invention.

EXAMPLE I 1,035 lbs. of sodium silicate solution containing 4.83% $SiO_2$ and 1.47% $Na_2O$ was continuously mixed in a mixing nozzle wtih 40.23 lbs. of 39.25% sulfuric acid over a period of about 15 minutes to form a silica hydrosol, which had a gelation time of about 5 minutes. The complete mix was aged for about 15 minutes to insure gelation of the last material added. This yielded a silica hydrogel having a pH of 10.15.

To this hydrogel was added 120.65 lbs. of 23.56% alum solution containing 1.94% sulfuric acid and the mixture was thoroughly agitated to insure uniformity. The alum addition completed neutralization of the silicate and the pH of the resulting mixture was 3.1.

To the silica-alumina slurry was then added 30.87 lbs. of ammonia solution analyzing 30.50% $NH_3$, to precipitate the remaining alum as alumina. Sufficient ammonia was added to raise the pH of the slurry to 7.6 and after a 15-minute aging period the pH dropped back to about 6.9.

The ammoniated slurry was then filtered, dried, and washed to remove the sulfate and sodium ions, and re-dried. Washing of the hydrated silica-alumina composite was easily accomplished, it being no more difficult than catalysts prepared by conventional methods.

The following Table I shows a comparison of the catalyst prepared according to the method as herein disclosed and the catalyst prepared according to a conventional method. In the preparation of each of the catalysts, the nominal percent $SiO_2$ in the sol was 4.7%. The method was that of the above patent.

Table I

|  | Conventional method, percent | Present invention, percent |
| --- | --- | --- |
| $Al_2O_3$ (dry basis) | 15.22 | 13.61 |
| $Na_2O$ (dry basis) | 0.032 | 0.038 |
| $SO_4$ (dry basis) | 0.07 | 0.053 |
| D+L—Thermal | 54.9 | 56.2 |
| D+L—Steam | 29.0 | 28.6 |

A comparison of the products shows that the catalyst prepared according to the present invention was equal and, in some respects, superior to the catalyst manufactured by the prior art method.

A further comparison of the two catalysts is shown in Table II. The catalysts were prepared according to the methods hereinbefore described, using a concentration of the silica in the initial sol of 5.3%.

Table II

|  | Conventional method, percent | Present invention, percent |
| --- | --- | --- |
| $Al_2O_3$ (dry basis) | 14.60 | 14.39 |
| $Na_2O$ (dry basis) | 0.033 | 0.036 |
| $SO_4$ (dry basis) | 0.10 | 0.05 |
| D+L—Thermal | 54.0 | 57.0 |
| D+L—Steam | 28.0 | 32.0 |

It can be seen that the silica-alumina catalyst prepared according to the instant method was equal or superior in substantially all respects to the silica-alumina catalyst prepared by the conventional method. The elimination, in the present invention, of the steps of treating the silica hydrogel with additional acid and ammonia prior to the alum addition did not affect the quality of the catalyst. Nor did the elimination of these steps present any operating difficulties.

In catalytic cracking operations, the decline of catalytic activity is most rapid during the early period of use and generally levels out over an extended period. In order to determine the stability of the catalyst, accelerated tests have been devised to simulate the conditions prevailing during the early period of catalyst use where the decrease of catalytic stability is most pronounced.

Two prominent methods used for testing the catalyst involve thermal and steam deactivation of the catalyst. These methods are described in Industrial and Engineering Chemistry, November 1947, pp. 1138–1143, "Testing of Cracking Catalysts," by Conn and Connolly, and in Petroleum Refiner, June 1952, "Progress Made in Design of Catalyst Activity Test Units," by Ivey and Veltman.

In general, a sample of fresh catalyst is compressed into pellets and split into two portions, one for thermal deactivation and the other for steam deactivation. The thermal deactivation is carried out in a battery of three muffle furnaces at temperatures of 500° F., 1050° F., and 1550° F. The sample is moved from the low temperature to the next higher temperature muffle, remaining in each for three hours. Steam deactivation is carried out by holding the catalyst in an atmosphere of steam at 1050° F. and 60 p.s.i.g. for 24 hours.

In carrying out the cracking activity test, 200 ml. of the deactivated catalyst is placed in a reactor and maintained at a temperature of 850° F. During a period of 2 hours, 238.2 ml. of virgin East Texas light gas oil is passed through the hot catalyst. The cracked products are recovered and separated. The fraction which distills below 400° F. as well as gas and loss is determined, and is designated as the distillate plus loss (D+L).

To obtain a comparison between the catalyst of the present invention and the catalysts prepared by conventional commercial methods, the results obtained from testing four different samples of catalyst taken during a plant production test of the present invention were averaged for comparison with average results obtained from tests of commercial products over a period of about seven months. Catalyst "A," as used herein, designates material produced by the method described in the above Patent No. 2,462,236. Catalyst "B" refers to material produced by a modification thereof as described in U.S. application Serial No. 351,487 of Charles P. Wilson, Jr., now U.S. Patent No. 2,777,822. Each of these processes is used on a large commercial scale. These catalysts were tested as described above and the results of the tests are compared in the following Table III.

Table III

THERMAL TREATMENT AT 1550° F.

|  | Catalyst A | Catalyst B | Catalyst present invention |
| --- | --- | --- | --- |
| D+L | 51.5 | 52.0 | 51.1 |
| Gas, weight, percent | 7.6 | 7.6 | 7.1 |
| Carbon on oil feed | 4.2 | 4.1 | 4.0 |
| Weight, percent conversion | 52.7 |  | 52.1 |
| Vol., percent conversion | 53.9 | 54.2 | 53.0 |

STEAM DEACTIVATION 24 HRS. AT 1050° F.—60 P.S.I.G.

|  | Catalyst A | Catalyst B | Catalyst present invention |
| --- | --- | --- | --- |
| D+L | 29.4 | 29.1 | 29.4 |
| Gas, weight percent | 3.3 | 3.3 | 3.5 |
| Carbon on oil feed | 1.29 | 1.24 | 1.05 |
| Weight percent conversion | 29.3 |  | 29.1 |
| Vol. percent conversion | 29.6 | 29.3 | 29.4 |
| Carbon factor |  | 1.22 | 1.02 |
| Gas factor |  | 1.08 | 1.13 |

A comparison of the foregoing results shows that the silica-alumina cracking catalyst prepared according to the present invention is equal and in some respects superior to the catalysts prepared by conventional methods.

In simplifying the method of manufacturing catalysts as described, economic advantages are gained as well. The following Table IV shows the amounts of raw materials used in the present process and the conventional process. In this table, the concentration of $SiO_2$ in the sol was 3.9%. In each process, the finished product was a nominal 87–13 silica-alumina catalyst.

Table IV

|  | Tons of raw material/ton of product | | |
| --- | --- | --- | --- |
|  | Conventional method | Present invention | Material saving |
| Sodium silicate, 40° Bé | 3.21 | 3.21 |  |
| Sulfuric acid, 60° Bé | 1.19 | 0.99 | 0.20 |
| Alumina hydrate, 65% | 0.23 | 0.23 |  |
| Ammonia, anhydrous | 0.20 | 0.14 | 0.06 |

When employing a silica concentration in the sol of 3.9%, the present invention results in a net saving of approximately 400 pounds of acid and 120 pounds of ammonia per ton of finished catalyst. As the concentration of the silica in the sol is increased, the saving in raw materials increases accordingly. The following Table V shows the amount of raw materials employed in the present process and in the conventional process when the concentration of silica in the sol is 6.3%. The finished product resulting from each process was a nominal 87–13 silica-alumina catalyst.

Table V

|  | Tons of raw material/ton of product | | |
| --- | --- | --- | --- |
|  | Conventional method | Present invention | Material saving |
| Sodium silicate, 40° Bé | 3.19 | 3.19 |  |
| Sulfuric acid, 60° Bé | 1.20 | 0.92 | 0.28 |
| Alumina hydrate, 65% | 0.24 | 0.24 |  |
| Ammonia, anhydrous | 0.22 | 0.14 | 0.08 |

From the above Table V, it can be readily seen that the saving in raw materials is increased when a sol having a concentration of 6.3% is employed. Here, the present invention results in a saving of approximately 560 pounds of acid and 160 pounds of ammonia per ton of finished catalyst.

Further, there are fewer operations in the present process, which means a saving due to the elimination of operators. There is, of course, a minor saving because of decreased equipment maintenance and the release of some equipment and space. The usages of acid and ammonia are decreased sufficiently to result in a 20% to 25% increase in storage capacity in terms of days supply of raw materials.

The silica-alumina material prepared according to the present invention may be spray-dried to form microspheres, or it may be dried to form granules, which may be used as such, or ground, or formed into pellets. The material is not only useful in cracking high boiling hydrocarbon oil to produce gasoline, but also as a carrier when impregnated with an active material in reforming straight-run or cracked gasoline.

Having thus described my invention, I claim:

1. A process for producing a silica-alumina catalyst suitable for use in the catalytic cracking of hydrocarbons comprising the steps of interacting a sodium silicate solution with sulfuric acid to form an alkaline silica hydrosol at a pH of about 10, allowing the hydrosol to gel, commingling therewith sufficient aluminum sulfate solution having a pH of about 1.0 to provide the desired alumina concentration in the final catalyst and thereby lowering the pH to about 3.1, said aluminum sulfate solution containing about 2% of free sulfuric acid, adding ammonia to the resulting mixture to obtain a pH of about 7.5 to precipitate alumina, aging the ammoniated slurry, filtering, drying, washing and redrying the resulting product.

2. A process for producing an 87–13 silica-alumina catalyst suitable for use in the catalytic cracking of hydrocarbons comprising the steps of continuously mixing sodium silicate and sulfuric acid to form a silica hydrosol at a pH of about 9.5 to 10.5, allowing the hydrosol to gel, commingling therewith sufficient alum solution containing about 1.5 to 2.5% free sulphuric acid to provide the desired alumina concentration in the final catalyst and thereby lowering the pH to about 3, adding ammonia to the resulting mixture to obtain a pH of about 7.5 to precipitate alumina, aging the ammoniated slurry, filtering, drying, washing the dried silica-alumina composite of impurities, and redrying the washed material.

3. A process for producing a silica-alumina catalyst comprising the steps of interacting an alkali metal silicate solution with a mineral acid in amounts sufficient to form a silica hydrosol having a pH of about 9.5 to 10.5, allowing the hydrosol to gel, commingling with the resulting alkaline hydrogel sufficient alum solution to provide the desired alumina concentration in the final catalyst, said alum solution containing enough free acid to lower the pH of the mixture well below neutral, adding sufficient ammonia to the mixture to precipitate the alumina at about the neutral point, and washing and drying the resulting product.

4. A process according to claim 3 in which the alkali metal silicate is sodium silicate.

5. A process according to claim 3 in which the mineral acid is sulphuric acid.

6. A process according to claim 4 further characterized in that the mineral acid is sulphuric acid.

7. A process for producing a silica-alumina catalyst suitable for use in the catalytic cracking of hydrocarbons comprising the steps of interacting a sodium silicate solution with sulphuric acid to form a silica hydrosol at a pH of about 9.5 to 10.5, agitating the hydrosol during gelation to form an aqueous slurry of hydrated silica, commingling with said slurry sufficient acidic alum solution to provide the desired alumina concentration in the final catalyst, said alum solution containing enough free acid to lower the pH of the mixture to about 3, adding sufficient ammonia to raise the pH of the resulting mixture to about 6.9 to 7.6 and effect precipitation of alumina, and drying, washing and redrying the resulting product.

8. A process for producing a silica-alumina catalyst suitable for use in the catalytic cracking of hydrocarbons comprising the steps of interacting a sodium silicate solution with sulphuric acid to form a silica hydrosol at a pH of about 10, agitating the hydrosol during gelation to form an aqueous slurry of hydrated silica, commingling therewith sufficient alum solution containing a small amount of free sulphuric acid to provide the desired alumina concentration in the final catalyst and lower the pH to about 3, adding sufficient ammonia to raise the pH of the resulting mixture to about 6.9–7.6 and cause precipitation of alumina, and drying, washing and redrying the resulting product.

References Cited in the file of this patent

UNITED STATES PATENTS

| 2,462,236 | Thomas | Feb. 22, 1949 |
| 2,474,888 | Connolly | July 5, 1949 |
| 2,562,888 | Bond | Aug. 7, 1951 |
| 2,684,340 | Baral et al. | July 20, 1954 |

UNITED STATES PATENT OFFICE

CERTIFICATE OF CORRECTION

Patent No. 2,904,521 September 15, 1959

Leon L. Baral

It is hereby certified that error appears in the printed specification of the above numbered patent requiring correction and that the said Letters Patent should read as corrected below.

Column 2, line 24, after "and" insert -- acid --.

Signed and sealed this 1st day of March 1960.

(SEAL)
Attest:

KARL H. AXLINE
Attesting Officer

ROBERT C. WATSON
Commissioner of Patents